United States Patent Office 2,781,022
Patented Feb. 12, 1957

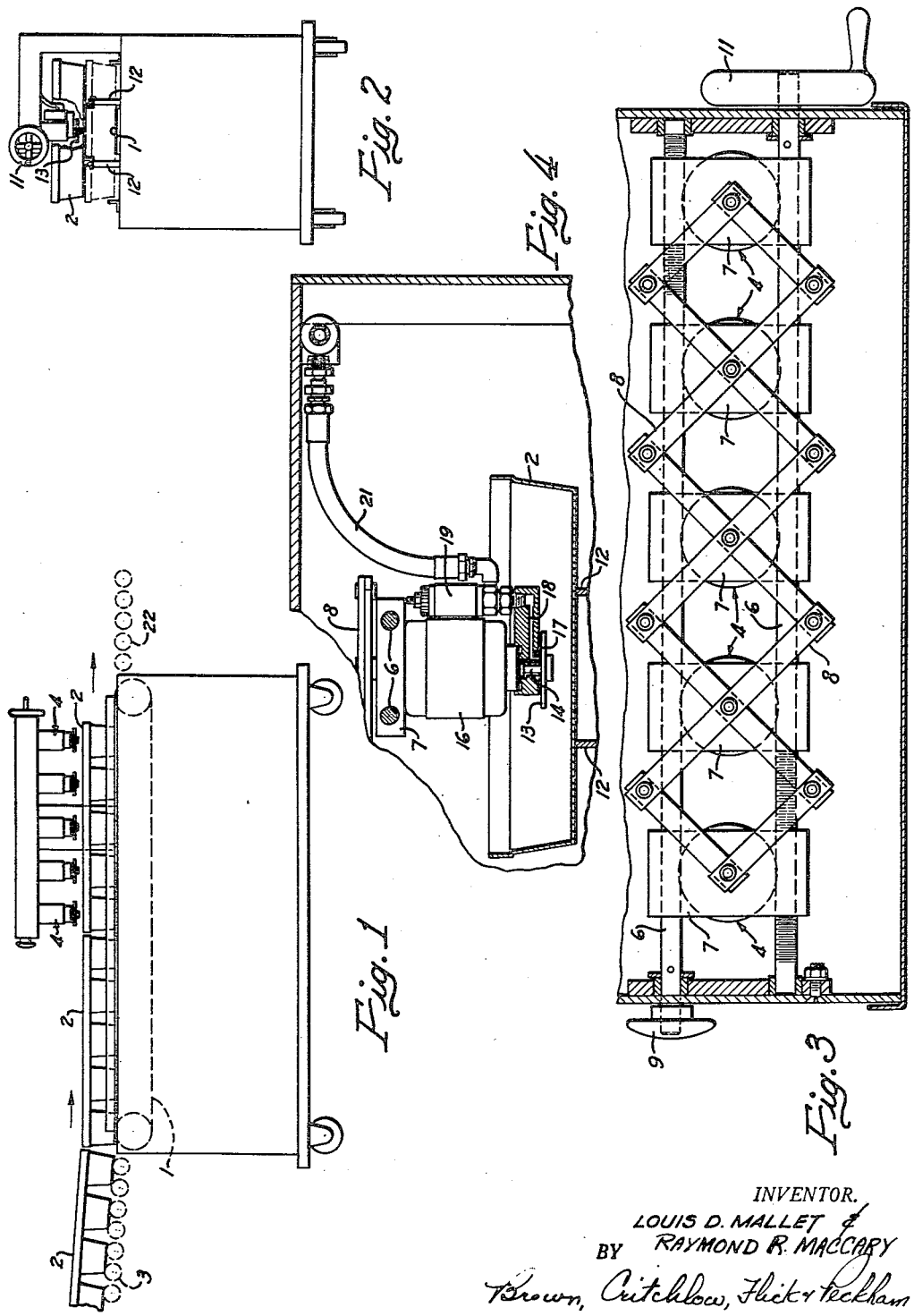

2,781,022

PAN COATING APPARATUS

Louis D. Mallet, Pittsburgh, and Raymond R. Maccary, Export, Pa., assignors to Mallet & Company, Inc., Pittsburgh, Pa., a corporation of Pennsylvania Application March 9, 1954, Serial No. 414,942

3 Claims. (Cl. 118—313)

This invention relates to a machine for coating the inside surfaces of baking pans with a film of grease, or other coating compound, that will assure the release of baked goods from the pans after the baking operation.

Heretofore, it has been customary for such machines to spray or to brush the grease onto the interior surfaces of the pans, without, in either case, providing adequate control over the distribution of the grease, resulting in its deposition on portions of the pans that do not come in contact with the baked goods. Subsequently, during the baking operation the grease carbonizes on those areas and makes the pans difficult to clean. In addition, where a spray type greasing machine is used, the grease is generally dispersed in an atomized mist that is wasteful of the grease and coats the machine itself and adjacent objects with a highly objectionable film.

It is accordingly among the object of this invention to provide apparatus for distributing a uniform film of grease or some other coating compound only on predetermined areas of the interior surfaces of a baking pan, without losses due to atomization.

It is a further object to provide such apparatus in which the interior side surfaces of the pan may be coated with a uniform film of coating compound in the form of a continuous band or ribbon of any desired width that will permit the release of baked goods from the pan.

Still further objects include provision of such apparatus in which a plurality of pans may be coated quickly and simultaneously, and in which the operating mechanism is simple and dependable in operation.

This invention is illustrated in the accompanying drawings, in which:

Fig. 1 is a diagrammatic side elevation of the pan greasing apparatus;

Fig. 2 is a similar end elevation of the same apparatus, showing a baking pan elevated into the coating position;

Fig. 3 is an enlarged detail view of the adjustable mounting of the grease dispensing heads shown in Fig. 1; and Fig. 4 is an enlarged detail drawing, partly in section, of the dispensing head and baking pan shown in Fig. 2.

In accordance with this invention, the pan coating apparatus comprises a dispensing head that includes a rotor disc that is adapted to rotate at high speed in a horizontal plane. The pan to be coated is first brought into vertical registration with the disc and either the pan or the rotor is then moved vertically to bring the rotor inside the pan. A metered quantity of coating material is then introduced under pressure onto the upper surface of the rotor at a point inside its periphery, where it is subjected to large shearing forces by the rotation of the rotor and reduced to a thin film on the rotor surface. This film moves radially outward over the top surface of the rotor and is finally flung by centrifugal force radially outward from the edge of the rotor against the inside surfaces of the pan where it forms a narrow band of coating on the interior surfaces of all four sides of the pan. By raising or lowering the pan relative to the rotor, the width of the band of coating can be increased to cover the desired area on the sides of the pan to insure the release of baked goods. By varying the speed of the rotor the size of the flung particles can be controlled and made as fine as desired, so as to control the thickness of the coating film on the sides of the pan.

Referring to the drawings, the pan greasing machine includes a conveyor 1 adapted to receive a plurality of strapped baking pans 2 from a delivery conveyor 3 at one side of the machine. Usually five or less baking pans come strapped together as a single unit as shown in Fig. 1, and the pan greasing machine illustrated in the drawings has five dispensing heads 4, one for each pan in such a strapped group. The number of dispensing heads could, of course, be more or less than five, depending on the number of pans it is desired to coat simultaneously.

Spacing means are provided, as shown in detail in Fig. 3, for changing the horizontal spacing of the dispensing heads 4 to conform to the spacing of the pans in any strapped group. This spacing means includes two horizontal support rods 6, each threaded at one end opposite the threaded end of the other rod. Suspended on these rods are support blocks 7, which support the dispensing heads 4. The support blocks are slidably received on the support rods with the exception of the support blocks at each end, which threadably engage the threaded end of each rod. The support blocks are connected together by the lazy tong arrangement of interconnected metal bars 8. Rotation of the upper support rod in Fig. 3, by turning the knob 9 on the left end of that rod, permits the righthand dispensing head to be indexed with respect to its supporting frame; and rotation of the lower support rod, by turning the handwheel 11, adjusts the position of the lefthand dispensing head and also adjusts, through the lazy tong arrangement, each of the intermediate dispensing heads to space them in accordance with the size and spacing of the pans to be coated.

Where a group of strapped pans is moved by the conveyor 1 into position below the dispensing heads, it is held there by indexing means not shown in the drawings. After the dispensing heads have been properly spaced to register with the pan openings, a vertically movable pan support 12, shown in Fig. 2, raises the group of strapped pans so that the rotor disc 13 of each dispensing head is received within one of the pans, which are then in a position to be coated.

As shown in detail in Fig. 4, each dispensing head includes a rotor 13 in the form of a disc, which is mounted on the shaft 14 of an electric motor 16 and is rotated at high speed in a horizontal plane. The top surface of the rotor is preferably smooth but, if so desired, may be finned, grooved or otherwise contoured. While each rotor disc preferably has a flat upper surface, as shown in the drawings, it is to be understood that such upper surface may be of conical, hemispherical, or other shape, and that a plurality of discs may be used for coating each pan. Immediately above the rotor, and preferably as near to its supporting shaft as is practicable, is an opening 17, which is connected by a passage 18 to a conventional metering valve 19, which is in turn connected by a conduit 21 to a reservoir (not shown) of grease or other coating compound. The purpose of the metering valve is to feed predetermined or metered quantities of grease or other coating compound upon the upper surface of the rotor. The valve shown in Fig. 4 is charged with a measured amount of grease by pressure in the conduit 21 and is discharged by spring action within the valve when the pressure in the conduit is vented, such venting being done by conventional means (not shown) when the pans reach the end of their vertical travel on the movable pan support 12. The grease or coating compound delivered by the metering device through the opening 17 to the top surface of the rapidly rotating rotor 13 tends to move radially outward on that surface by centrifugal action. Inasmuch as the area of this rotor surface increases as the square of its diameter, each particle of grease as it moves radially outward tends to cover an ever larger area and is therefore subjected to increasingly higher shear stresses until it is reduced to the thickness of a uniform film near the edge of the disc, from which it is finally thrown radially outward against the interior surfaces of the pan. During the greasing operation the pan is continuously raised (or lowered) by the pan support 12, so that the coating is deposited on the sides of the pan in the form of a continuous band, the height of which is controlled by the vertical distance the pan is moved during the greasing operation and the thickness of which is controlled by the quantity of grease that is metered to the rotor, by the rate at which the pan is raised, and by the speed of the rotor. During the greasing operation the pan is preferably raised relative to the rotor, so that when the pan is thereafter lowered, any residual grease remaining on the rotor is flung radially outward to coat areas already coated. As a result, the rotor will be dry and free of grease when the pan is finally lowered into its original position on the conveyor 1, shown in Fig. 1, from which it can be moved to the right onto the delivery conveyor 22.

It is among the advantages of this invention that it is designed to apply a measured quantity of grease or other coating compound to the inside surfaces of a baking pan, and to insure proper release of baked goods from the pan. There are no losses due to atomization since the grease is thrown by the rotor radially outward in the plane of the rotor until it strikes and adheres to the pan. The grease may be deposited over controlled areas on the inside surfaces of the sides of the pan where it has been found that proper greasing assures the later release of baked goods. In other words, with the apparatus of this invention, there is no deposit of grease on undesired areas of the pan where it might carbonize during the baking cycle and make the pan difficult to clean. This is a condition which has been found to be unavoidable with all greasing machines of the spray or brush type. Furthermore, since the rotor disc projects the coating compound radially in all directions in equal amounts, this assures the deposit of a uniform coating on the interior side surfaces of the pan, regardless of the pan's shape or size; and it will be readily apparent that the amount of coating compound applied may be increased or decreased by varying the measured quantity of grease fed by the metering device on to the rotor disc. In addition, this invention permits a plurality of pans in a strapped set to be greased simultaneously, with the application to each pan of a uniform band of coating that will result in baked goods having a uniform surface texture and coloring, and having no oily taste caused by the excessive application of grease.

A further advantage of the present invention resides in its capability to apply compound greases of high viscosity at room temperatures, that is without requiring the application of external heat to reduce that viscosity, while conventional spray greasing machines must either use a light oil or heat the grease to render it less viscous for proper atomization. As a result, the coating applied by conventional machines tends to drain by gravity from the areas where it is directly applied to other areas of the pan where the presence of grease or oil is not desired. With the apparatus of this invention, on the other hand, any drainage of the applied coating is entirely eliminated, since the coating is sufficiently viscous to adhere to the lateral surfaces of the pan. A still further advantage of applying such viscous compound greases is that they normally cause much less smoking during the baking process than do oils and greases of lighter viscosity.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Apparatus for applying a coating compound in a band of predetermined width to the interior side surfaces of an open top baking pan, comprising a rotor disc adapted to rotate at high speed and having a flat upper surface lying in a horizontal plane, means for supporting the pan horizontally with its open top below the rotor, elevating means for effecting relative vertical movement between the pan and rotor for receiving the rotor inside the pan and for varying the depth of the rotor below the top of the pan, dispensing means for introducing a measured quantity of coating compound onto the upper surface of the rotor inward of its periphery while the rotor is rotating inside the pan and while the pan and rotor are being moved vertically relative to each other by said elevating means, whereby the coating compound will be flung radially outward from the periphery of the rotor onto the interior side surfaces of the pan in the form of a continuous band the width of which is determined by the extent of the relative vertical movement between the pan and rotor during the time that this coating compound is being flung outward by the rotor.

2. Apparatus for applying a coating compound in a band of predetermined width to the interior side surfaces of a strapped group of baking pans, comprising a plurality of flat rotor discs, one for each pan in said group, adapted to rotate at high speed in a horizontal plane; means for supporting the pans below the rotor discs; means for horizontally spacing all of the rotor discs simultaneously as a unit to center each disc over a separate pan; elevating means for effecting relative vertical movement between the rotor discs and the group of pans as a unit and for varying the distance between each rotor disc and the bottom of the pan in which it is received; so that a rotor disc is received within each pan with the upper surface of the disc below the top of the pan; and dispensing means associated with each rotor disc for introducing a measured quantity of coating compound on to the upper surface of each rotor disc inward of its periphery while the rotor disc is rotating within the pan and while the pan and rotor are moving relative to each other by the operation of said elevating means.

3. Apparatus according to claim 2, in which the means for spacing the rotor discs includes a separate mounting block for each rotor disc on which the disc is rotatably mounted, horizontally extending support rods slidably supporting each block, lazy tong connections between the blocks, and means for horizontally displacing one of said blocks relative to another, thereby to adjust the spacing between each of said blocks.

References Cited in the file of this patent

UNITED STATES PATENTS

| | | |
|---|---|---|
| 1,558,593 | Coffin | Oct. 27, 1925 |
| 1,809,581 | Chvojka | June 9, 1931 |
| 1,989,880 | Peffer | Feb. 5, 1935 |
| 2,258,445 | Coopey | Oct. 7, 1941 |
| 2,387,362 | Stewart | Oct. 23, 1945 |
| 2,525,025 | Feil | Oct. 10, 1950 |
| 2,661,984 | Peebles et al. | Dec. 8, 1953 |
| 2,701,542 | Tench | Feb. 8, 1955 |